(12) United States Patent
Liu et al.

(10) Patent No.: US 12,423,894 B2
(45) Date of Patent: Sep. 23, 2025

(54) IMAGE DISPLAY METHOD, IMAGE DISPLAY DEVICE AND ELECTRONIC DEVICE

(71) Applicants: QINGDAO HAIER TECHNOLOGY CO., LTD, Qingdao (CN); HAIER SMART HOME CO., LTD, Qingdao (CN)

(72) Inventors: Chao Liu, Qingdao (CN); Zeqi Sun, Qingdao (CN)

(73) Assignees: QINGDAO HAIER TECHNOLOGY CO., LTD, Qingdao (CN); HAIER SMART HOME CO., LTD, Qingdao (CN)

( * ) Notice: Subject to any disclaimer, the term of this patent is extended or adjusted under 35 U.S.C. 154(b) by 64 days.

(21) Appl. No.: 18/264,064

(22) PCT Filed: Apr. 19, 2022

(86) PCT No.: PCT/CN2022/087545
§ 371 (c)(1),
(2) Date: Aug. 2, 2023

(87) PCT Pub. No.: WO2022/262404
PCT Pub. Date: Dec. 22, 2022

(65) Prior Publication Data
US 2024/0104812 A1    Mar. 28, 2024

(30) Foreign Application Priority Data
Jun. 17, 2021    (CN) .......................... 202110673513.9

(51) Int. Cl.
*G06T 11/60*    (2006.01)
*G06T 3/40*    (2006.01)

(52) U.S. Cl.
CPC ................ *G06T 11/60* (2013.01); *G06T 3/40* (2013.01)

(58) Field of Classification Search
CPC ....... G06T 11/60; G06T 3/40; G06F 16/9577; G06F 16/958; Y02D 10/00
See application file for complete search history.

(56) References Cited

U.S. PATENT DOCUMENTS 7,133,050 B2 * 11/2006 Schowtka ............... G06T 11/60
345/620
7,548,334 B2 * 6/2009 Lo ......................... G06F 40/174
358/1.15
(Continued)

FOREIGN PATENT DOCUMENTS

| CN | 102682099 A | 9/2012 |
|---|---|---|
| CN | 111159447 A | 5/2020 |

(Continued)

OTHER PUBLICATIONS

Written Opinion issued in corresponding PCT Application No. PCT/CN2022/087545, dated Jun. 29, 2022.
(Continued)

*Primary Examiner* — Phi Hoang
(74) *Attorney, Agent, or Firm* — Westbridge IP LLC

(57) ABSTRACT

Disclosed are an image display method, an image display device, and an electronic device. The method includes: determining a target display area and a target image set to be displayed, wherein the target image set includes a plurality of images; according to the target display width of the target display area and the size-related information of the plurality of images, determining the target layout form of the placeholder containers associated with each of the plurality of images in the target display area; displaying the plurality of images in the placeholder containers associated therewith,
(Continued)

so that the target image set is displayed in the target display area.

17 Claims, 3 Drawing Sheets

(56) References Cited

U.S. PATENT DOCUMENTS

| | | | |
|---|---|---|---|
| 2005/0234981 A1* | 10/2005 | Manousos | H04N 1/00132 |
| 2008/0155387 A1* | 6/2008 | Yabe | G06F 40/103 |
| | | | 715/204 |
| 2009/0106648 A1* | 4/2009 | Mogilevsky | G06T 11/60 |
| | | | 715/243 |
| 2016/0004669 A1* | 1/2016 | Hunter | G06T 11/60 |
| | | | 715/243 |
| 2017/0372674 A1* | 12/2017 | Xie | G06V 40/172 |
| 2018/0225856 A1* | 8/2018 | Eckert | G06T 11/60 |

FOREIGN PATENT DOCUMENTS

| | | |
|---|---|---|
| CN | 111754407 A | 10/2020 |
| CN | 112862693 A | 5/2021 |
| CN | 113449222 A | 9/2021 |

OTHER PUBLICATIONS

First Office Action issued in counterpart Chinese Patent Application No. 202110673513.9, dated Jul. 12, 2022.
International Search Report issued in corresponding PCT Application No. PCT/CN2022/087545, dated Jul. 1, 2022.

* cited by examiner

IMAGE DISPLAY METHOD, IMAGE DISPLAY DEVICE AND ELECTRONIC DEVICE

CROSS REFERENCE OF RELATED APPLICATION

This application U.S. National Stage under 35 U.S.C. 371 of the International Application PCT/CN2022/087545, filed on Apr. 19, 2022, which claims priority to Chinese Patent Application No. CN202110673513.9, filed on Jun. 17, 2021. All of the aforementioned applications are incorporated herein by reference in their entireties.

TECHNICAL FIELD

The present disclosure relates to the technical field of electronic information, and more particularly to an image display method, an image display device, and an electronic device.

BACKGROUND

At present, when a group of images with different sizes are displayed on a web page, the web page usually has a placeholder container with a fixed position. By scaling and reordering images with different sizes, the images are displayed in the predetermined placeholder container to have a good visual effect on the web page.

In the practice of the embodiment of the present disclosure, it is found that at least the following problems of the related arts:

If the order of images has a certain function or meaning, the display of images in the above manner will lead to the disorder of the displaying images, and the display purpose of expressing specific meanings cannot be realized through the displaying images.

SUMMARY

In order to have a basic understanding of some aspects of the disclosed embodiments a brief summary is given below. The summary is not intended to be a general comment or to identify crucial/essential constituent elements or to describe the protection scope of these embodiments but rather to serve as a preface to the detailed description that follows.

The embodiment of the disclosure provides an image display method, an image display device and an electronic device, in order to solve the technical problem that disordering the displaying images of different sizes without expressing the meanings of ordering the displaying images only pursuing good visual effect in the conventional image displaying method.

In some embodiments, the image display method includes determining a target display area and a target image set to be displayed, the target image set including a plurality of images; according to a target display width of the target display area and a size-related information of the plurality of images; determining a target layout form of a plurality of placeholder containers associated with the plurality of images in the target display area; and displaying the plurality of images in the placeholder containers associated therewith, so that the target image set is displayed in the target display area.

In some embodiments, the image display device includes an acquisition module, a determination module, and an execution module. An acquisition module is configured to determine a target display area and a target image set to be displayed, the target image set including a plurality of images. A determination module is configured to, according to a target display width of the target display area and a size-related information of the plurality of images, determine a target layout form of a plurality of placeholder containers associated with the plurality of images in the target display area. An execution module is configured to orderly display the plurality of images in the placeholder containers associated therewith, so that the target image set is displayed in the target display area.

In some embodiments, the image display device includes a processor and a memory storing program instructions, wherein the processor executes the image display method when the program instructions are operated.

In some embodiments, the electronic device includes an image display device as described above.

The image display method, the image display device, and the electronic device provided by the embodiment of the disclosure can have the following technical effects:

According to the size-related information of the plurality of images to be displayed and the width information of the target display area, the target layout form of the placeholder containers associated with each of the plurality of images in the target display area is determined. Orderly displaying a plurality of images in the placeholder containers associated therewith, so that the target image set is efficiently displayed in the target display area. In this way, according to the relevant information of the images to be displayed and the target display area, the layout form of the placeholder containers is re-determined, and then the plurality of images are orderly displayed at the positions of the respectively associated placeholder containers, which not only realizes that the layout order of the images is not changed during displaying a plurality of images with different sizes, but also can express more information by displaying the images, and the visual effect of displaying the images in the target display area, so that the appearance of the displaying images is improved.

The above general description and the description below are exemplary and explanatory only and are not intended to limit the present disclosure.

BRIEF DESCRIPTION OF THE DRAWINGS

One or more embodiments are illustrated by means of the corresponding drawings, which do not constitute a limitation of the embodiments, elements having the same reference numerals in the drawings are shown as similar elements, and the drawings do not constitute a limitation of proportion, wherein.

DETAILED DESCRIPTION OF THE EMBODIMENTS

In order to enable a more detailed understanding of the features and technical content of the embodiments of the present disclosure, the implementation of the embodiments of the present disclosure will be described in detail below in conjunction with the accompanying drawings, which are for illustration only and are not intended to limit the embodiments of the present disclosure. In the following technical description for convenience of explanation, several details are provided for a full understanding of the disclosed embodiments. However, one or more embodiments may still be practiced without these details. In other instances, the well-known structures and devices may simplify the disclosure in order to simplify the drawings.

The terms "first", "second" and the like in the specification and claims of embodiments of the present disclosure and the above drawings are used to distinguish similar elements and are not necessarily used to describe a particular order or priority. It should be understood that the data used in this way can be interchanged where appropriate for the embodiments of the present disclosure described herein. Furthermore, the terms "include" and "have" and any variations thereof are intended to cover a non-exclusive inclusion.

Unless otherwise illustrated, the term "a plurality of" means two or more.

In the embodiment of the present disclosure, the character "I" indicates that the front element and rear element are in an "or" relationship. For example, A/B illustrates A or B.

The term "and/or" is an association relationship that describes elements, indicating that there can be three relationships. For example, A and/or B represent relationships: A, B, or A and B.

Figure 1:
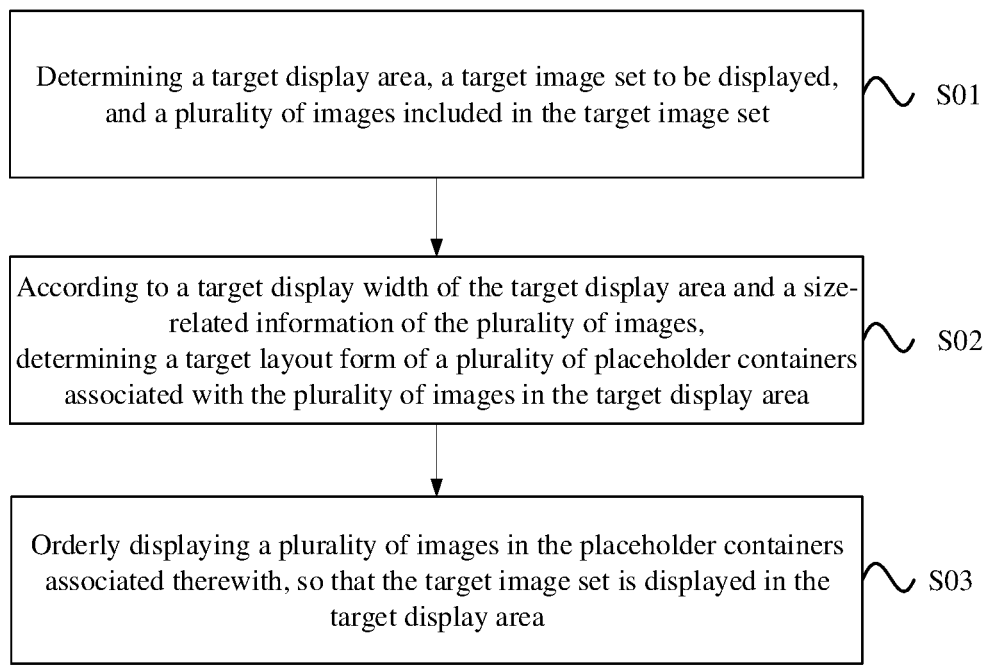
FIG. 1 is a schematic diagram of an image display method provided by an embodiment of the present disclosure.

With reference to FIG. 1, the embodiment of the present disclosure provides an image display method including:

S01, determining a target display area, a target image set to be displayed, and a plurality of images included in the target image set.

S02, according to a target display width of the target display area and a size-related information of the plurality of images, determining a target layout form of a plurality of placeholder containers associated with the plurality of images in the target display area.

S03, displaying the plurality of images in the placeholder containers associated therewith, so that the target image set is displayed in the target display area. Optionally, orderly displaying the plurality of images in the associated placeholder containers.

With the image display method provided by the embodiment of the present disclosure, the target layout form of the placeholder containers associated with the plurality of images in the target display area can be determined according to the size-related information of the plurality of images to be displayed and the width information of the target display area. Orderly displaying a plurality of images in the placeholder containers associated therewith, so that the target image set is efficiently displayed in the target display area. In this way, according to the relevant information of the images to be displayed and the target display area, the layout form of the placeholder containers is re-determined, and then the plurality of images are orderly displayed at the positions of the respectively associated placeholder containers, which not only realizes that the layout order of the images is not changed during displaying a plurality of images with different sizes, but also can express more information by displaying the images, and the visual effect of displaying the images in the target display area, so that the appearance of the displaying images is improved.

Optionally, the execution subject matter for executing the above steps can be a server, and the server has a communication connection established with an electronic device for displaying images through a communication module of the electronic device. The communication module of the electronic device sends the target image set to be displayed to the server. In a case where the server receives a target image set to be displayed, the server acquires a target display area of the electronic device and determines a target display width of the target display area. According to a target display width of the target display area and a size-related information of the plurality of images, the server determines a target layout form of a plurality of placeholder containers associated with the plurality of images in the target display area. The server sends the determined target layout form of the placeholder containers to the electronic device. According to the received target layout form, the electronic device orderly displays a plurality of images in the associated placeholders, so that the target image set is displayed in the target display area of the electronic device.

In the embodiment of the present disclosure, the electronic device can be an electronic display screen. It can also be an intelligent portable device such as a mobile phone or a tablet computer with a display function. It can also be smart household appliances such as smart refrigerators, smart televisions, smart air conditioners, smart speakers, and smart washing machines with display functions. There are no specific limitations. The embodiments of the present disclosure take the present disclosure of an image display method applied on a smart television as an example, and other embodiments of the present disclosure also apply the image display method on other electronic devices.

In practice, the target display area can be the area for displaying images on the web page displayed by the electronic device. Generally, the width of the display area of the web page is the width of the display interface of the electronic device, but the length of the display area of the web page can be adjusted according to the content to be displayed as the web page is scrolled.

Optionally, the placeholder containers can define a plurality of service areas of the target display area for displaying images.

In the related arts, in a case where an image is displayed on a web page, if the target display area is determined, a plurality of fixed placeholder containers with predetermined position information and size information will exist in the target display area, and the image to be displayed can be displayed in each placeholder container. However, in the embodiments of the present disclosure, the determined target display area has no placeholder containers displayed, since there is no predetermined position information or size information. According to the size-related information of the plurality of images to be displayed and the width information of the target display area, the target layout form of the placeholder containers associated with each of the plurality of images in the target display area is determined. Here, the target layout form includes the determined position information and size information of each of placeholder containers. Therefore, according to the relevant information of the images to be displayed and the target display area, the setting positions of the placeholder containers and the like are determined, and the image display manner of the placeholder containers fixed setting in the related arts is changed, so that the image can be aesthetic and effectively displayed in the target display area.

Optionally, the size-related information of the images includes an actual width data of the images, an actual height data, and an aspect ratio data of the images.

Optionally, determining the actual width data and the actual height data of the images, includes: acquiring pixel parameters of the images; and according to the pixel parameters of the images, determining the actual width data and the actual height data of the images. The aspect ratio data of the images can be determined by dividing the actual width data by the actual height data to determine the aspect ratio data of the images.

Optionally, in a case where the size-related information of the images includes the actual width data of the images, the actual height data, and the aspect ratio data of the images, according to the target display width of the target display area and the size-related information of the plurality of images, determining the target layout form of the placeholder containers associated with the plurality of images in the target display area, including: according to the actual height data of the plurality of images, determining the average height data of the images in the target image set; according to the average height data, the aspect ratio data of the plurality of images, and the target display width of the target display area, determining the size information of the placeholder associated with each of the plurality of images; according to the size information, determining the target layout form.

Optionally, the size information of the placeholder includes a height parameter of the placeholder and a width parameter of the placeholder. The position information of the placeholder can define the setting position of the placeholder in the target display area. Since a plurality of images corresponds to a plurality of placeholder containers, the target layout form of the plurality of placeholder containers includes: the size information of each of the plurality of placeholder containers and the position information of each of the plurality of placeholder containers in the target display area.

Optionally, according to the actual height data of the plurality of images, determining the average height data of the images in the target image set, includes: cyclically accumulating the actual height data of each image and calculating the average height data of the images in the cyclically accumulating.

Optionally, the image display method further includes: setting the average height data as the height parameter of the placeholder container corresponding to each of the plurality of images. In a case where the height parameters of the placeholder containers are determined according to the obtained average height data, the placeholder containers arranged according to the target layout form are in a neat state in each row, and the width parameters of each placeholder container are set differently according to the size-related information of corresponding images to be displayed. The layout form of the placeholders can make the images displayed in the placeholder more aesthetic and effectively display in the target display area.

Optionally, the size information of the placeholder includes the height parameter and the width parameter. According to the average height data, the aspect ratio data of a plurality of images, and the target display width of the target display area, determining the size information of the placeholder associated with each of the plurality of images, includes: setting a product of the average height data and the aspect ratio data of the image as the width parameter of the placeholder corresponding to the image. Furthermore, setting the average height data is the height parameter of the placeholder container corresponding to the image. In this way, it is capable of determining the target layout form of the placeholder containers corresponding to a plurality of images.

Optionally, the size information includes the height parameter and the width parameter. According to the size information, determining the target layout form, includes: according to the width parameters of the placeholder containers associated with each of the plurality of images and the target display width of the target display area, determining the number of placeholder containers capable of being accommodated in the target display area; and according to the number of placeholder containers capable of being accommodated in the target display area, determining the position information of placeholder containers associated with each of the plurality of images, for example evenly arranging in one row; and arranging the placeholder containers associated with a plurality of images according to corresponding position information thereof.

Optionally, the image display method further includes: obtaining an image arrangement order in the target image set; in a case where the width parameters of the placeholder containers corresponding to the plurality of images are obtained, the width parameters of the placeholder containers corresponding to each image are sequentially accumulated according to the image arrangement order in the target image set, and the sum of the width parameters of the placeholder containers obtained by accumulation is set as the first contrast width. The first contrast width is a dynamically varying value, and the first contrast width is re-assigned once every time one of the width parameters of the placeholder container is accumulated.

Optionally, each time the first contrast width is re-assigned, the re-assigned first contrast width is compared with the target display width of the target display area, and in a case where the first contrast width exceeds the target display width, the placeholder containers corresponding to the width parameters accumulated by the first contrast widths before re-assignment are arranged as placeholder containers in one row. By circulating the above process, the placeholder containers corresponding to a plurality of images to be displayed can be arranged.

Figure 2:
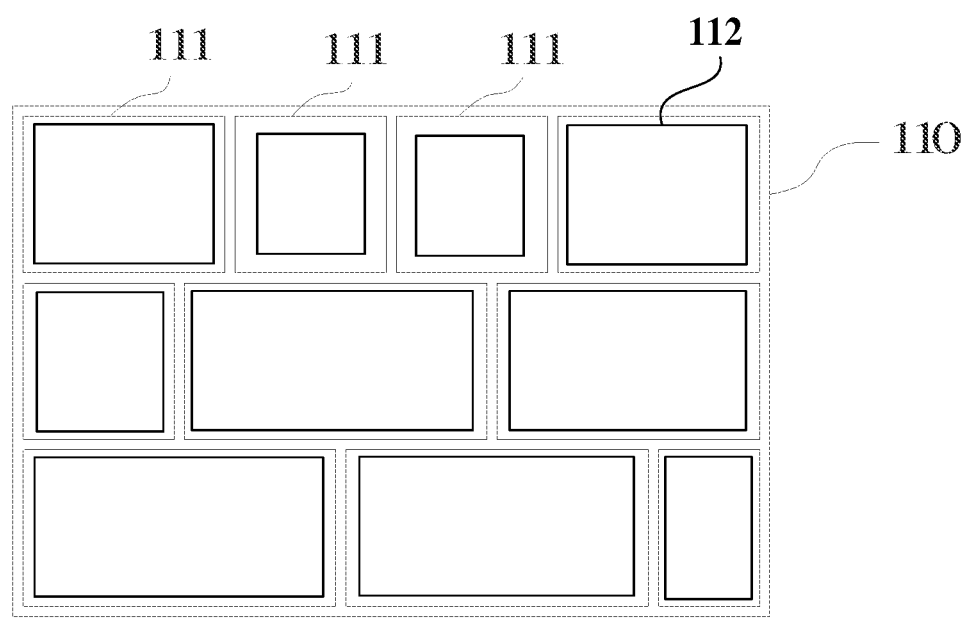
FIG. 2 is a schematic diagram of a web page for displaying the images according to the embodiment of the present disclosure.

In a practical, as shown in FIG. 2, a plurality of placeholder containers 111 are provided in the target display area 110 of a web page in the target layout form. The position information and the size information of each placeholder are determined according to the situation of the image to be displayed and the target display area, instead of a predetermined placeholder with fixed position information and the size information. The placeholder containers 111 arranged according to the above method is in a neat state in the horizontal direction. By displaying images on the associated placeholder 111, more information can be expressed by displaying images 112 without changing the layout order of images 112, and the images 112 can be displayed more aesthetically and effectively in the target display area 110.

Optionally, a predetermined interval threshold can be acquired as the interval distance between the placeholder containers 111 in each row and/or the interval distance between each row of the placeholder containers 111.

In this way, the number of placeholder containers 111 arranged in each row in the target display area 110 can be effectively determined, And the setting position of the placeholder containers 111 in each row is determined. It provides a basis for matching and displaying the images 112 to be displayed in the corresponding placeholder containers 111.

Optionally, displaying the images 112 in the placeholder containers 111, includes: according to the size information of the placeholder container 111 associated with the image 112, scaling the images 112 according to the aspect ratio data to match the image 112 within the associated placeholder container 111. Thus, the layout form of the placeholder containers 111 corresponding to each image 112 is determined according to the size-related information of a plurality of images 112 to be displayed and the width information of the target display area 110. A plurality of images 112 are orderly displayed in the respectively associated placeholder containers 111 by at least including centering and the like. It not only can display a plurality of images 112 with different sizes without changing the layout order of images 112, but also can express more information by displaying images 112, and the image can be aesthetical and effectively displayed in the target display area.

Optionally, the image display method further includes: centrally displaying the image in the corresponding placeholder container. Specifically, if the aspect ratio data of the image is larger than the predetermined reference ratio, according to the size information of the placeholder corresponding to the image, the actual width data or the actual height data of the image are scaled.

Optionally, after determining the target image set to be displayed, the image display method further includes: selecting one or more images having a pixel range outside a reference pixel range from the plurality of images, and image preprocessing based on the images having the pixel range outside the reference pixel range. The image preprocessing operation includes: scaling the images according to the predetermined reference pixel. The reference pixel range can be determined by predetermined reference pixels. For example, setting the default reference pixel to 200px for the width pixel of the image and 200px for the height pixel of the image, where px is a pixel in computer language.

For example, setting the predetermined reference pixel as the width pixel of the image is 200px and the height pixel of the image is 200px, the reference pixel range can be that the width pixel of the image is less than or equal to 200px, and/or the height pixel of the image is less than or equal to 200px. In the case where the image has a pixel range outside the reference pixel range, the width pixel of the image is greater than 200px, and/or the height pixel of the image is greater than 200px.

Optionally, the image preprocessing operation includes: scaling the images according to the predetermined reference pixel. For example, setting the predetermined reference pixel as the width pixel of the image is 200px and the height pixel of the image is 200px, if the detected width pixel of the image is larger than 200px, but the height pixel of the image is smaller than or equal to 200px, a reduction operation is performed on the image without changing the aspect ratio data of the image, and the width pixel of the image is reduced to 200px. And the image height of the reduced image is set as the actual height data of the image.

Figure 3:
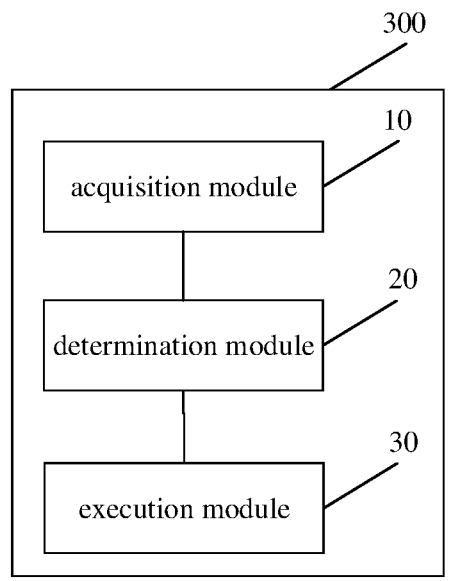
FIG. 3 is a schematic diagram of an image display device provided by the embodiment of the present disclosure.

With reference to FIG. 3, the embodiment of the present disclosure provides an image display device 300 including an acquisition module 10, a determination module 20, and an execution module 30. An acquisition module 10 is configured to determine a target display area and a target image set to be displayed, the target image set including a plurality of images. A determination module 20 is configured to, according to a target display width of the target display area and a size-related information of the plurality of images, determine a target layout form of a plurality of placeholder containers associated with the plurality of images in the target display area. An execution module 30 is configured to orderly display the plurality of images in the placeholder containers associated therewith, so that the target image set is displayed in the target display area.

With the image display method provided by the embodiment of the present disclosure, the target layout form of the placeholder containers associated with the plurality of images in the target display area can be determined according to the size-related information of the plurality of images to be displayed and the width information of the target display area. Orderly displaying a plurality of images in the placeholder containers associated therewith, so that the target image set is efficiently displayed in the target display area. In this way, according to the relevant information of the images to be displayed and the target display area, the layout form of the placeholder containers is re-determined, and then the plurality of images are orderly displayed at the positions of the respectively associated placeholder containers, which not only realizes that the layout order of the images is not changed during displaying a plurality of images with different sizes, but also can express more information by displaying the images, and the visual effect of displaying the images in the target display area, so that the appearance of the displaying images is improved.

Figure 4:
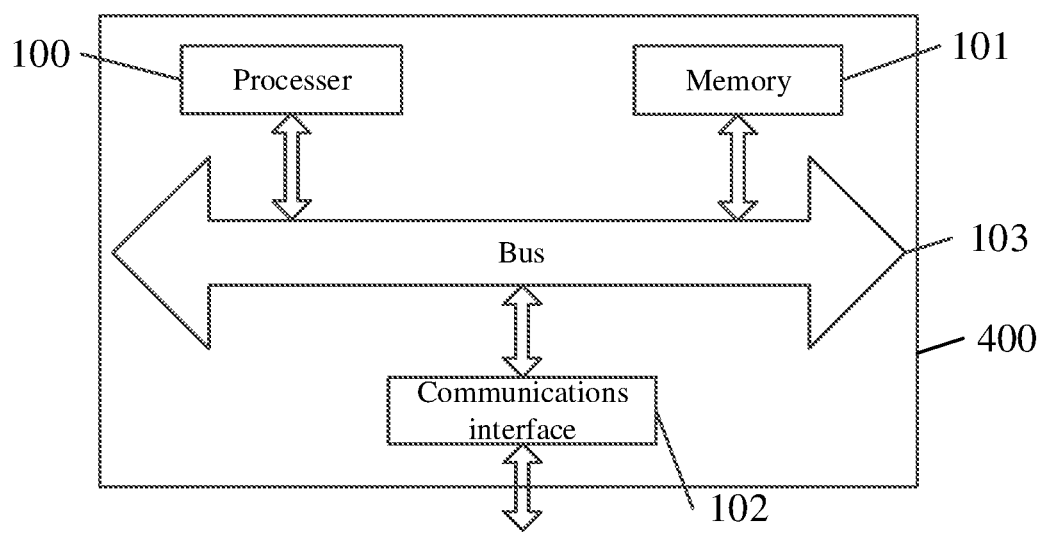
FIG. 4 is a schematic diagram of another image display device provided by the embodiment of the present disclosure.

With reference to FIG. 4, the embodiment of the present disclosure provides an image display device 400 including a processor 100 and a memory 101. Optionally, the device may also include a communication interface 102 and a bus 103. The processor 100, the communication interface 102, and the memory 101 can communicate with each other through the bus 103. The communication interface 102 can be used for information transmission. The processor 100 may invoke logic instructions in the memory 101 to execute the image presentation method of the above-described embodiments.

Further, the logic instructions in the memory 101 described above can be realized in the form of software functional units and can be stored in a computer readable storage medium when sold or used as a separate product.

As a computer readable storage medium, the Memory 101 can be used to store software programs, computer executable programs, such as program instructions/modules corresponding to the methods in embodiments of the present disclosure. The processor 100 executes functional present disclosures and data processing by running program instructions/modules stored in the memory 101 that is to implement the image display method in the above-described embodiment.

The memory 101 may include a stored program area and a stored data area wherein the stored program area may store the present disclosure program required for at least one function of the operating system. The storage data area may store data created according to the use of the terminal device. In addition, the memory 101 may include a high-speed random access memory and may also include a non-volatile memory.

The embodiment of the present disclosure provides an electronic device comprising the image display device 300/400.

With the image display method provided by the embodiment of the present disclosure, the target layout form of the placeholder containers associated with the plurality of images in the target display area can be determined according to the size-related information of the plurality of images to be displayed and the width information of the target display area. Orderly displaying a plurality of images in the placeholder containers associated therewith, so that the target image set is efficiently displayed in the target display area. In this way, according to the relevant information of the images to be displayed and the target display area, the layout form of the placeholder containers is re-determined, and then the plurality of images are orderly displayed at the positions of the respectively associated placeholder containers, which not only realizes that the layout order of the images is not changed during displaying a plurality of images with different sizes, but also can express more information by displaying the images, and the visual effect of displaying the images in the target display area, so that the appearance of the displaying images is improved.

Optionally, the electronic device can be an electronic display screen. It can also be an intelligent portable device such as a mobile phone or a tablet computer with a display function. It can also be smart household appliances such as smart refrigerators, smart televisions, smart air conditioners, smart speakers, and smart washing machines with display functions. There are no specific limitations. The embodiments of the present disclosure take the present disclosure of an image display method applied on a smart television as an example, and other embodiments of the present disclosure also apply the image display method on other electronic devices.

In practice, the target display area can be the area for displaying images on the web page displayed by the electronic device. A server associated with the web page determines a target display area and a target image set to be displayed, the target image set including a plurality of images. According to a target display width of the target display area and a size-related information of the plurality of images, determining a target layout form of a plurality of placeholder containers associated with the plurality of images in the target display area. Orderly displaying a plurality of images in the placeholder containers associated therewith, so that the target image set is displayed in the target display area.

The embodiment of the present disclosure provides a computer-readable storage medium storing computer-executable instructions arranged to execute the image display method.

The embodiment of the present disclosure provides a computer program product comprising a computer program stored on a computer-readable storage medium, the computer program comprising program instructions that, when executed by a computer, cause the computer to execute the image display method.

The computer-readable storage medium can be a transient computer-readable storage medium or a non-transient computer-readable storage medium.

The technical solution of the disclosed embodiments can be embodied in the form of a software product stored in a storage medium, including one or more instructions for causing a computer device (which can be a personal computer, server, or network device, etc.) to perform all or part of the steps of the method of the disclosed embodiments. The aforementioned storage medium can be a non-transient storage medium, including a U disk, a mobile hard disk, a Read-Only Memory (ROM), a Random Access Memory (RAM), a magnetic disk or an optical disk, and other media capable of storing program codes, or can be a transient storage medium.

The above description and drawings sufficiently illustrate embodiments of the present disclosure to enable those skilled in the art to practice them. Other embodiments may include structural logical electrical procedural and other changes. Embodiments represent only possible variations. Unless explicitly required, individual parts and functions are optional, and the order of operation can vary. Portions and features of some embodiments can be included in or in place of portions and features of other embodiments. Furthermore, the terms used in the present disclosure are used only to describe embodiments and are not used to limit the claims. As used in the embodiments and in the description of the claims, the singular forms article "a", "an", and "the" are intended to include the plural forms as well, unless the context clearly indicates. Similarly, the term "and/or" as used in this present disclosure means encompassing one or more associated lists of any and all possible combinations. Additionally, when used in this present disclosure, the term "comprise" and its variants "comprises" and/or "comprising", etc. refer to the presence of stated features, totals, steps, operations, elements, and/or components, but do not exclude the presence or addition of one or more other features, totals, steps, operations, elements, components, and/or groupings of these. In the absence of further limitations, an element defined by the phrase "includes/comprises an . . . " does not preclude the existence of another identical element in the process, method or device in which the element is included. Herein each embodiment can be highlighted as being different from the other embodiments and the same similar parts between the various embodiments can be referred to with respect to each other. For the method, product, etc. disclosed by the embodiment, if it corresponds to the method portion disclosed by the embodiment, reference can be made to the description of the method portion where relevant.

Those skilled in the art will appreciate that the various example units and algorithm steps described in connection with the embodiments disclosed herein can be implemented in electronic hardware or a combination of computer software and electronic hardware. Whether these functions are performed in hardware or software can depend on the specific present disclosure and design constraints of the technical solution. The skilled artisan may use different methods for each particular present disclosure to implement the described functionality but such implementation should not be considered outside the scope of the disclosed embodiments. It will be apparent to the skilled person that for convenience and conciseness of description, the specific operating processes of the above-described systems, devices, and units can be referred to the corresponding processes in the aforementioned method embodiments and will not be repeated herein.

In the embodiments disclosed herein, the disclosed methods, and products (including but not limited to devices, devices, etc.) can be implemented in other ways. For example, the above-described embodiment of the device is only schematic, for example, the division of the unit can be only a logical function division, and in practice there can be another division mode, for example, multiple units or components can be combined or integrated into another system, or some features can be ignored or not performed. In addition, the coupling or direct coupling or communication connection between each other shown or discussed can be indirect coupling or communication connection through some interface, device or unit, and can be electrical, mechanical or other form. The elements illustrated as separate elements may or may not be physically separated, and the elements displayed as elements may or may not be physical elements, i.e. can be located in one place, or can be distributed over a plurality of network elements. Some or all of the units can be selected according to actual needs to realize the embodiment. In addition, each functional unit in the embodiment of the present disclosure can be integrated in one processing unit, each unit may exist physically alone, or two or more units can be integrated in one unit.

The flowcharts and block diagrams in the accompanying drawings illustrate the architecture functionality and operation of possible implementations of systems methods and computer program products according to embodiments of the present disclosure. In this regard, each block in a flow chart or block diagram may represent a module, program segment, or part of code containing one or more executable instructions for performing a specified logical function. In some alternative implementations the functions indicated in the boxes may also occur in a different order than those indicated in the drawings. For example, two successive boxes can actually be executed substantially in parallel, or they can sometimes be executed in reverse order, depending on the functionality involved. In the description corresponding to the flowcharts and block diagrams in the drawings, the operations or steps corresponding to different blocks may also occur in a different order than that disclosed in the description, and sometimes there is no specific order between the different operations or steps. For example, two successive operations or steps can actually be performed substantially in parallel, or they can sometimes be performed in reverse order, depending on the functionality involved. Each block in the block diagram and/or flow chart, and a combination of the blocks in the block diagram and/or flow chart, can be implemented in a dedicated hardware-based system that performs a specified function or action, or can be implemented in a combination of dedicated hardware and computer instructions.

The invention claimed is:

1. An image display method, comprising:
   determining a target display area, a target image set to be displayed, and a plurality of images included in the target image set;
   according to a target display width of the target display area and a size-related information of the plurality of images, determining a target layout form of a plurality of placeholder containers associated with the plurality of images in the target display area; and
   displaying the plurality of images in the placeholder containers associated therewith, so that the target image set is displayed in the target display area;
   wherein the size-related information comprises an actual width data of the images, an actual height data of the images, and an aspect ratio data of the images; and
   the according to a target display width of the target display area and a size-related information of the plurality of images, determining a target layout form of the plurality of placeholder containers associated with the plurality of images in the target display area, comprises:
   according to actual height data of the plurality of images, determining an average height data of the plurality of images in the target image set;
   according to the average height data, the aspect ratio data of the plurality of images, and the target display width of the target display area, determining a size information of the placeholder containers associated with the plurality of images; and
   according to the size information, determining the target layout form.

2. The image display method according to claim 1, wherein the size information of the placeholder containers comprises a height parameter and a width parameter; and
   the according to the average height data, the aspect ratio data, and the target display width of the target display area, determining the size information of the placeholder containers associated with the plurality of images, comprises:
   a product of the average height data and the aspect ratio data is defined as the width parameter of the placeholder containers associated with the plurality of images.

3. The image display method according to claim 2, further comprising:
   setting the average height data as the height parameter of the placeholder container associated with the plurality of images.

4. The image display method according to claim 3, wherein the displaying a plurality of images in the placeholder containers associated therewith comprises:
   according to the size information of the placeholder containers associated with the plurality of images, scaling the plurality of images according to the aspect ratio data to match the images with the associated placeholder containers.

5. The image display method according to claim 3, after the determining a plurality of images included in the target image set, further comprising:
   selecting one or more images having a pixel range outside a reference pixel range from the plurality of images, and
   image preprocessing based on the images having the pixel range outside the reference pixel range;
   wherein the image preprocessing comprises: according to a predetermined reference pixel, scaling the images having the pixel range outside the reference pixel range.

6. The image display method according to claim 2, wherein the displaying a plurality of images in the placeholder containers associated therewith comprises:
   according to the size information of the placeholder containers associated with the plurality of images, scaling the plurality of images according to the aspect ratio data to match the images with the associated placeholder containers.

7. The image display method according to claim 2, after the determining a plurality of images included in the target image set, further comprising:
   selecting one or more images having a pixel range outside a reference pixel range from the plurality of images, and
   image preprocessing based on the images having the pixel range outside the reference pixel range;
   wherein the image preprocessing comprises: according to a predetermined reference pixel, scaling the images having the pixel range outside the reference pixel range.

8. The image display method according to claim 1, wherein the size information of the placeholder containers comprises a width parameter; and
   the according to the size information, determining the target layout form, comprises:
   according to the width parameter of the placeholder containers associated with the plurality of images and the target display width of the target display area, determining the number of placeholder containers capable of being accommodated in the target display area;
   according to the number of placeholder containers capable of being accommodated in the target display area, determining the position information of placeholder containers associated with the plurality of images; and arranging the placeholder containers associated with the plurality of images according to the position information.

9. The image display method according to claim 8, wherein the size information of the placeholder containers comprises a height parameter; and the according to the average height data, the aspect ratio data, and the target display width of the target display area, determining the size information of the placeholder containers associated with the plurality of images, comprises:

a product of the average height data and the aspect ratio data is defined as the width parameter of the placeholder containers associated with the plurality of images;

setting the average height data as the height parameter of the placeholder container associated with the plurality of images.

10. The image display method according to claim 8, wherein the displaying a plurality of images in the placeholder containers associated therewith comprises:

according to the size information of the placeholder containers associated with the plurality of images, scaling the plurality of images according to the aspect ratio data to match the images with the associated placeholder containers.

11. The image display method according to claim 8, after the determining a plurality of images included in the target image set, further comprising:

selecting one or more images having a pixel range outside a reference pixel range from the plurality of images, and image preprocessing based on the images having the pixel range outside the reference pixel range;

wherein the image preprocessing comprises: according to a predetermined reference pixel, scaling the images having the pixel range outside the reference pixel range.

12. The image display method according to claim 1, wherein the displaying a plurality of images in the placeholder containers associated therewith comprises:

according to the size information of the placeholder containers associated with the plurality of images, scaling the plurality of images according to the aspect ratio data to match the images with the associated placeholder containers.

13. The image display method according to claim 12, after the determining a plurality of images included in the target image set, further comprising:

selecting one or more images having a pixel range outside a reference pixel range from the plurality of images, and image preprocessing based on the images having the pixel range outside the reference pixel range;

wherein the image preprocessing comprises: according to a predetermined reference pixel, scaling the images having the pixel range outside the reference pixel range.

14. The image display method according to claim 1, after the determining a plurality of images included in the target image set, further comprising:

selecting one or more images having a pixel range outside a reference pixel range from the plurality of images, and image preprocessing based on the images having the pixel range outside the reference pixel range;

wherein the image preprocessing comprises: according to a predetermined reference pixel, scaling the images having the pixel range outside the reference pixel range.

15. The image display method according to claim 14, wherein the displaying a plurality of images in the placeholder containers associated therewith comprises:

according to the size information of the placeholder containers associated with the plurality of images, scaling the plurality of images according to the aspect ratio data to match the images with the associated placeholder containers.

16. The image display method according to claim 1, wherein the size information of the placeholder containers comprises a height parameter; and the according to the average height data, the aspect ratio data, and the target display width of the target display area, determining the size information of the placeholder containers associated with the plurality of images, comprises:

setting the average height data as the height parameter of the placeholder container associated with the plurality of images.

17. An image display device, comprising a processor and a memory having program instructions stored therein, wherein the processor is configured to execute the image display method according to claim 1 when executing the program instructions.

* * * * *